United States Patent [19]

Alhilali et al.

[11] 4,432,077
[45] Feb. 14, 1984

[54] DETERMINATION OF FORMATION PERMEABILITY FROM A LONG-SPACED ACOUSTIC LOG

[75] Inventors: Khalid A. Alhilali, Houston; Joseph Zemanek, Jr., Dallas, both of Tex.

[73] Assignee: Mobil Oil Corporation, New York, N.Y.

[21] Appl. No.: 222,102

[22] Filed: Jan. 2, 1981

[51] Int. Cl.$^3$ .............................................. G01V 1/28
[52] U.S. Cl. .................................................... 367/31
[58] Field of Search ................ 367/31, 32, 166; 181/5

[56] References Cited

U.S. PATENT DOCUMENTS

| | | | |
|---|---|---|---|
| 1,176,350 | 6/1937 | Lebreton et al. | |
| 2,396,935 | 3/1946 | Walstrom | 181/102 |
| 2,842,220 | 7/1958 | Clifford et al. | 367/86 |
| 3,181,608 | 5/1965 | Palmer | 166/254 |
| 3,252,131 | 5/1966 | Vogel | 340/857 |
| 3,276,533 | 10/1966 | Pickett et al. | 367/34 |
| 3,292,143 | 12/1966 | Russell | 367/30 |
| 3,309,521 | 3/1967 | Bargainer, Jr. | 250/262 |
| 3,483,505 | 12/1969 | Adair | 367/31 |
| 3,622,969 | 11/1971 | Lebreton et al. | 367/30 |
| 3,648,278 | 3/1972 | Miller | 340/347 AD |
| 3,839,899 | 10/1974 | McMillen | 73/38 |
| 3,900,826 | 8/1975 | Dowling et al. | 367/31 |
| 3,962,674 | 6/1976 | Howell | 367/30 |
| 4,178,577 | 12/1979 | Cini et al. | 367/166 X |

FOREIGN PATENT DOCUMENTS 1176350 6/1967 United Kingdom.
1534854 12/1978 United Kingdom.

OTHER PUBLICATIONS

Emmet D. Riggs, "Seismic Wave Types in a Borehole", Geophysics, vol. 20, No. 1 (Jan. 1955), pp. 60-67.
R. E. Sheriff, Encyclopedic Dictionary of Exploration Geophysics, 1973, p. 2.
J. J. Stahl and J. D. Robinson, "Permeability Profiles From Acoustic Logging", 52nd Annual Fall Technical Conference and Exhibition of the Society of Petroleum Engineers of AIME, (Oct. 1977) pp. 1-4.
J. H. Rosenbaum, "Synthetic Microseismograms: Logging in Porous Formations", Geophysics, vol. 39, No. 1 (Feb. 1974) pp. 14-32.

Primary Examiner—Sal Cangialosi
Assistant Examiner—K. R. Kaiser
Attorney, Agent, or Firm—A. J. McKillop; M. G. Gilman; J. F. Powers, Jr.

[57] ABSTRACT

Disclosed is a method for determining the permeability of a formation which includes the steps of traversing a bore-hole with a tool having a means for transmitting low frequency acoustic energy. The transmitting means is pulsed and the acoustic energy is detected by a first wide band receiver having a frequency response of between at least 0.1k hertz and 30k hertz. The receiver is coupled to the transmitting means only by means of a cable which has a length exceeding about 5 feet and preferably a length of about 15 feet. The amplitude of tube waves detected by the receiver is determined at a plurality of locations in the bore-hole. The change of amplitude in tube waves at various of these locations provides a measure of permeability. The receiver employed preferably comprises a cylinder of piezoelectric material having end plates at the ends of the cylinder and a passageway through one of the end plates which transmits ambient but not dynamic pressure changes.

11 Claims, 7 Drawing Figures

DETERMINATION OF FORMATION PERMEABILITY FROM A LONG-SPACED ACOUSTIC LOG

BACKGROUND OF THE INVENTION

The present invention relates in general to a method of and an apparatus for acoustic well-logging and in particular it relates to a novel method for determining permeability of a formation insitu.

It is well-known that measurements of the conductivity and porosity of a formation are important in determining whether hydrocarbons are located therein, the hydrocarbon being found as non-conductive fluids in porous rock formations. It is also well-known, that hydrocarbons are generally not extractable from porous rock formations unless those formations are also permeable. At the present time, no apparatus is known for accurately measuring the permeability of a rock formation insitu. Accordingly, after hydrocarbons are detected, it has been generally necessary to obtain a sidewall core of a given formation in order to measure permeability in the laboratory. Such a technique is time consuming and unduly expensive.

Techniques of acoustic well-logging are also well-known and the possible applicability of such techniques to the determination of the permeability of a formation was predicted by Rosenbaum in the article "Synthetic Microseismograms: Logging In Porous Formations", *Geophysics*, Volume 39 Number 1 (February, 1974).

Rosenbaum investigated numerically, the ideal case of a borehole filled with an inviscid fluid surrounded by a formation that is porous and which conforms to Biot's theory. His investigation showed that the effect of the pore-fluid mobility on the calculated response is large and can be measured with an appropriate logging tool. He further predicted that the relative amplitude of a tube wave obtained from a sonic tool with a wide band frequency response would depend upon the permeability of the formation.

Reacting to the predictions of Rosenbaum, at least one attempt has been made to employ standard sonic logging tools for the determination of permeability. In a paper entitled "Permeability Profiles From Acoustic Logging", by J. J. Staal and J. D. Robinson, presented to the 52nd Annual Fall Technical Conference and Exhibition on the Society of Petroleum Engineers of A.I.M.I. held in Denver, Colo., Oct. 9–12, 1977, it was reported that with a standard Schlumberger sonic probe having transmitter-receiver spacing of up to 5 feet, a correlation could be detected between permeability and tube wave attenuation.

While standard sonic logging tools might be applicable for permeability determination, a need exists for improved techniques for permeability determination.

SUMMARY OF THE INVENTION

In accordance with an important aspect of the present invention, an improved method of determining permeability of a formation is disclosed in which a bore-hole is traversed with a tool having a means for transmitting low frequency acoustic energy. The transmitting means is pulsed and the acoustic energy is detected at a first receiver. In accordance with an important aspect of the present invention, the receiver has a frequency response in the range between 0.1k Hz and 30k Hz, the receiver being coupled to the transmitting means by a cable having a length exceeding 5 feet and preferably by a cable having a length of about 15 feet. Tube wave amplitude at such receiver is determined at a plurality of locations in the bore-hole. Changes in amplitude of tube waves are then observed from one of a plurality of locations in the bore-hole with respect to another of said locations. The change in tube wave amplitude gives a measure of formation permeability.

In accordance with another embodiment of the present invention, a second receiver is provided at which acoustic energy is detected. The second receiver is of the same type as the first and is situated at a distance of about 20 feet from the transmitting means. When the aforementioned second receiver is employed, the ratio of tube wave amplitude detected by the first detector vis-a-vis tube wave amplitude detected by the second detector is observed at each of a plurality of locations in the bore-hole. Changes in the aforementioned ratio also provide a measure of permeability of the logged formation.

In accordance with another important aspect of the present invention, the aforementioned detecting step is accomplished by means of a receiver which is of the type having a cylinder of piezoelectric material with end plates sealing both ends of the cylinder. A passageway through one of the end plates transmits ambient pressure changes, but not dynamic pressure changes into the cylinder. The proper length and cross-sectional area of the passageway is obtained by press fitting a tube of desired length and inside diameter into an opening in one of the end plates.

In accordance with another important embodiment of the present invention, the aforementioned transmitting means and receivers are not situated in an integral housing but are mechanically coupled to one another only by means of cables.

BRIEF DESCRIPTION OF THE DRAWINGS

The present invention will be more fully understood by reference to the accompanying drawings in which.

DETAILED DESCRIPTION OF THE PREFERRED EMBODIMENT

Figure 1:
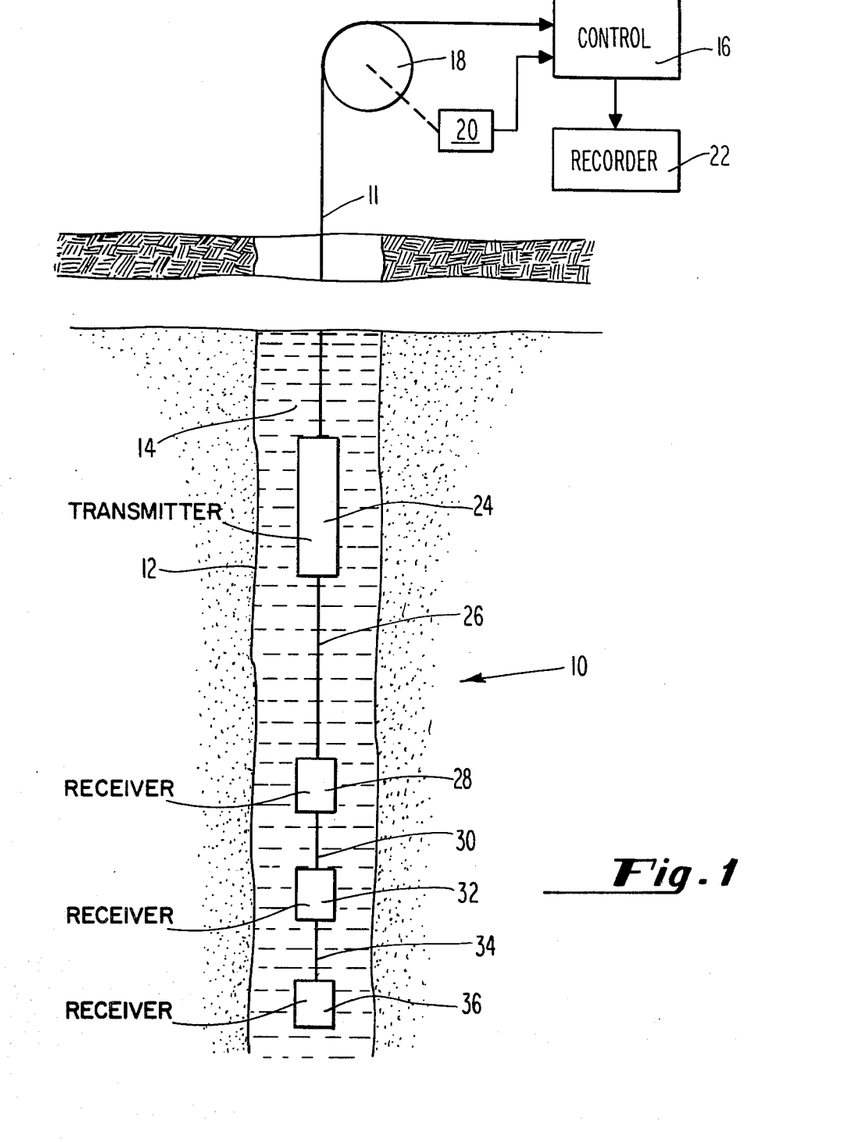
FIG. 1 is a schematic diagram of a well logging system including the improved acoustic well logging tool of the present invention.

Referring now to the drawing, with reference specifically to FIG. 1, an acoustic logging system for practicing the improved method of the present invention is illustrated schematically. The logging tool 10 is connected by means of a first cable 11 to the up-hole comnents of the system. The up-hole components will be more fully described below. The logging tool 10 is situated down-hole within a well 12 which is filled with fluid, such as drilling mud indicated by reference numeral 14.

The up-hole components includes a surface control panel 16 to which the cable 11 is directed over sheave 18. A motor 20 which is controlled from the surface control panel 16 operates the sheave 18 for raising or lowering the logging tool 10 in the well 12. An output means such as a digital recorder 22 is electrically connected to the surface control panel for recording and/or displaying the data detected from the logging tool 10.

In accordance with the present invention, the logging tool 10 includes a transmitter means 24 for transmitting a pulse of acoustic energy in the well 12. The pulse has a frequency spectrum centered about 20k Hz but low frequencies extending at least to 1k Hz are also transmitted. Connected by means of a cable 26 from the transmitting means 24 is a first wide band acoustic receiver 28. The wide band acoustic receiver 28 is responsive to frequencies between about 0.1k Hz and 30k Hz and will be more fully described by reference to FIG. 2 below.

In accordance with an important aspect of the present invention, the length of cable 26 exceeds about 5 feet and is preferably substantially longer than that. In accordance with the preferred embodiment of the present invention, the distance between the transmitting means and the first wide band receiver 28 is about 15 feet. Also in accordance with the present invention, a length cable 30 connects the first wide band acoustic receiver 28 with a second wide band acoustic receiver 32 and a third length of cable 34 connects the second acoustic wide band receiver 32 with a third wide band acoustic receiver 36. In accordance with the preferred embodiment of the present invention, the distance between the second receiver 32 and the transmitting means 34 is about 20 feet while the distance between the third receiver 36 and the transmitting means 24 is about 25 feet. Also, in accordance with the preferred embodiment, the receivers 28, 32 and 36 are not situated in an integral housing but are coupled to the transmitting means only by way of cables 26, 30 and 34.

It is well known, that the first waves to arrive at each of the receivers of an acoustic logging system are compressional waves usually followed by shear waves, then by mud waves and finally by tube waves. The relatively long transmitter-to-receiver spacing of the present invention provides time for the various wave packets to separate such that the aforementioned tube waves are more easily detectable.

Since in typical borehole conditions, the frequency of tube waves will be on the order of 1500 Hz or less, the recording of tube waves requires the use of the aforementioned wide band receivers 28, 32 and 36.

Figure 2:
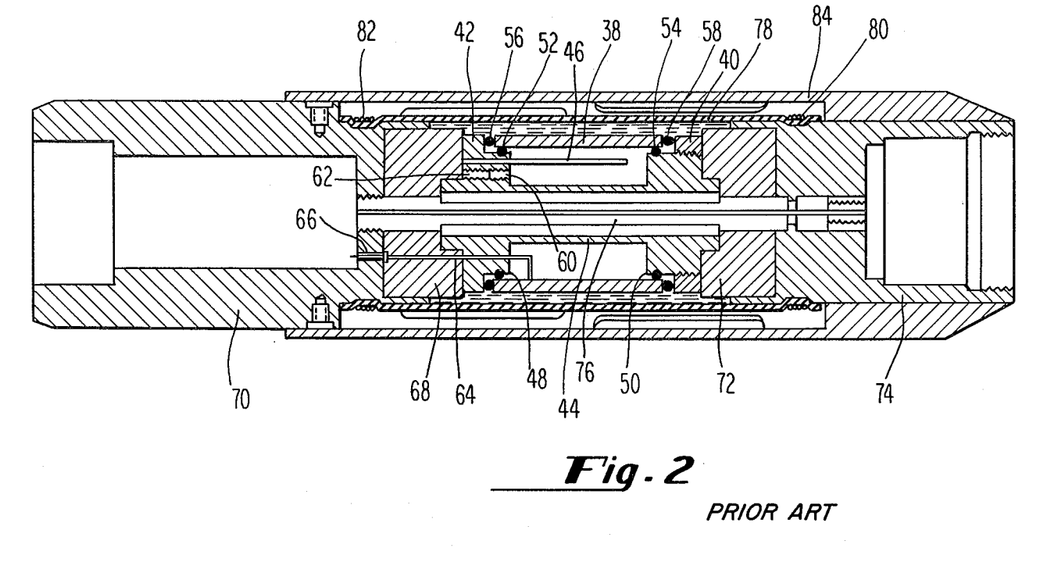
FIG. 2 is a cross-sectional view of one of the receivers utilized in the tool shown in FIG. 1.

Referring now to FIG. 2, one such receiver (28) will be described in detail.

Generally receivers having a band width desired in the practice of the present method are not capable of withstanding the severe environments encountered during acoustic logging. However, the receivers 28, 32 and 36 of the preferred embodiment of this invention have the required bandwith and yet are able to withstand high pressure. The receivers 28, 32 and 36 are all identical and include a cylinder 38 of piezoelectric material. In order to prevent dynamic pressure changes from being transmitted to the inside of the cylinder, end plates 40 and 42 are provided. The end plates are joined by a spool 44.

A tube 46 is press-fitted into an opening in the end plate 42. As will be more fully explained, the tube is tuned to the low cutoff frequency of the desired range, i.e., 0.1k Hz. The length and cross-sectional area of the inside of the tube are such that dynamic pressure changes in the frequency range above the cutoff frequency are not transmitted through the tube, but the tube does not permit the equalization of static pressure between the outside and inside of the cylinder.

End plate 42 has a portion 48 which fits inside the cylinder 38, and end plate 40 has a similar portion 50. Peripheral grooves in these portions receive O-rings 52 and 54 which isolate the piezoelectric material from the metal end plates and seal the ends of the cylinder. O-rings 56 and 58 further isolate the piezoelectric material from the end plates. A hole 60 is open such that the cylinder 38 may be evacuated and filled with oil. Thereafter, a set screw 62 seals the oil in place.

The cylinder 38 has a conductive coating on the inside and outside surfaces thereof. The electrical contact 64 is connected by a wire to the conductive surface inside the cylinder. Contact 64 is connected to an electrical feed-through 66 which extends through the transducer support 68 to the preamplifier which is included in the housing 70.

A transducer support 72 at the other end of the receiver is supported by a housing 74. A mandrel 76 joins the housings 70 and 74 together. The mandrel extends through the center of the receiver.

A rubber boot 78 surrounds the receiver. Wires at 80 and 82 encircle the boot and secure it firmly to the housings 70 and 74. A cage 84 surrounds and protects the boot. The boot is filled with oil. Acoustic energy is transmitted through slots in the cage 84 and this energy is transmitted through the boot 78 and the oil therein to the receiver which is sensitive to the acoustic energy over the entire seismic frequency range and higher. The boot 78 is able to withstand the high pressures of deep boreholes.

The criticality of the dimensions of the passageway formed by the tube 46 can best be appreciated by reference to the analog electrical low-pass filter. A low-pass electrical filter includes an inductance and capacitance.

The volume encased by the piezoelectric cylinder (tank) and the smaller diameter passageway (constriction) form an acoustic filter. The material (water or oil) in the tank is stiffness controlled and is analogous to a capacitance. The material in the constriction is mass controlled and therefore analogous to an inductance. The capacitance can be expressed $$C_a = \frac{V}{\rho v^2} \quad (1)$$

and the inductance as:

$$L_a = \rho \frac{L_e}{A_c} \quad (2)$$

The cutoff frequency for such a low-pass filter is given by:

$$f_c = \frac{1}{\pi \sqrt{L_a C_a}} \quad (3)$$

where,
- $L_\alpha$ is the inductance, or inertia, and
- $C_\alpha$ is the capacitance or mass.

As an example, consider an embodiment of the present invention where the inside diameter $d_2$ of the cylinder 38 is $1\frac{3}{8}$ inches, the diameter $d_1$ of the spool 44 is $\frac{5}{8}$ inch, and the length L of the cylinder is 1.1875 inches. Also, the length $L_e$ of the tube 46 is 1.5 inches with an inside diameter of 1/64 inch.

The cross-sectional area of the tube 46 is:

$$A_c = \frac{\pi}{4}\left(\frac{1}{64}\right)^2 = .0001917 \text{ sq. in.} \quad (4)$$

$$= .001237 \text{ sq. cm.}$$

The inertia, which is equivalent to inductance, is given by:

$$L_\alpha = \rho \frac{L_e}{A_c} = 1 \times \frac{1.5 \times 2.54}{.001237} \quad (5)$$

$$= 30.32 \times 10^2$$

The volume of the inside of the cylinder is:

$$V = \frac{\pi}{4}(d_2^2 - d_1^2)L \quad (6)$$

$$= \frac{\pi}{4}(1\tfrac{3}{8}^2 - \tfrac{5}{8}^2)(1\,3/16)$$

$$= \frac{\pi}{4}(1.89 - .39)(1.1875)$$

$$= 1.398 \text{ cu. in.}$$

$$= 22.91 \text{ cc.}$$

Mass, which is equivalent to capacitance, is given by:

$$C_\alpha = \frac{V}{\rho v^2} = \frac{22.91}{1.0 \times (1.5 \times 10^5)^2} \quad (7)$$

$$= 10.18 \times 10^{-10}$$

where,
- $\rho$ is the density of the material in the cylinder which is assumed to be water for purpose of this example, and
- $v$ is the velocity of sound in this material.

From the foregoing, the cutoff frequency for this specific embodiment is:

$$f_c = \frac{1}{\pi\sqrt{L_\alpha C_\alpha}} = \frac{.3185}{\sqrt{30.82 \times 10.18 \times 10^{-4}}} = \frac{.3185}{17.71} = 179.8 \quad (8)$$

This indicates a low cutoff frequency of 180 Hz which is improved considerably by filling the cylinder with oil. Such a cutoff frequency is sufficiently low to cause the receiver 28 to respond to tube waves.

The foregoing apparatus described in FIGS. 1 and 2 is utilized in the practice of the present method. In practicing that method the tool 10 traverses the borehole of the well 12 and the transmitting means is pulsed and acoustic energy is detected at receivers 28, 32 and 36.

Figure 3:
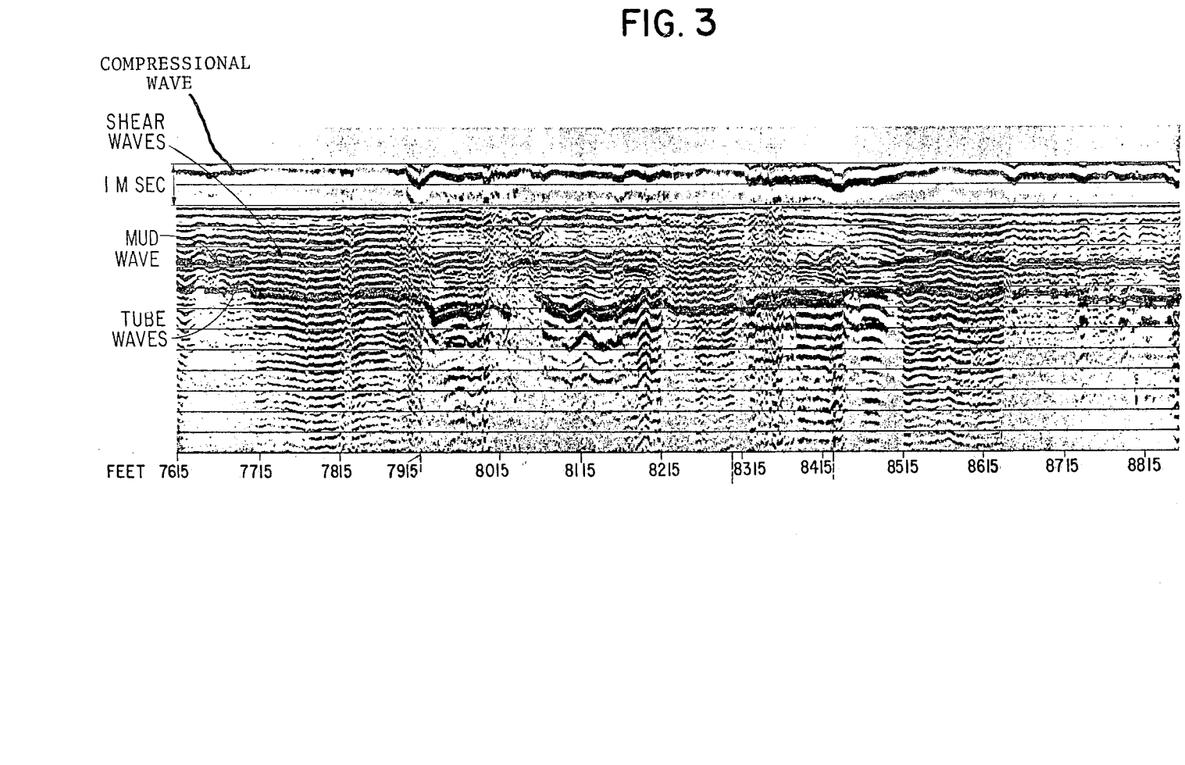
FIGS. 3 and 4 are normalized wave train records obtained employing the well logging system of FIG. 1.
Figure 4:
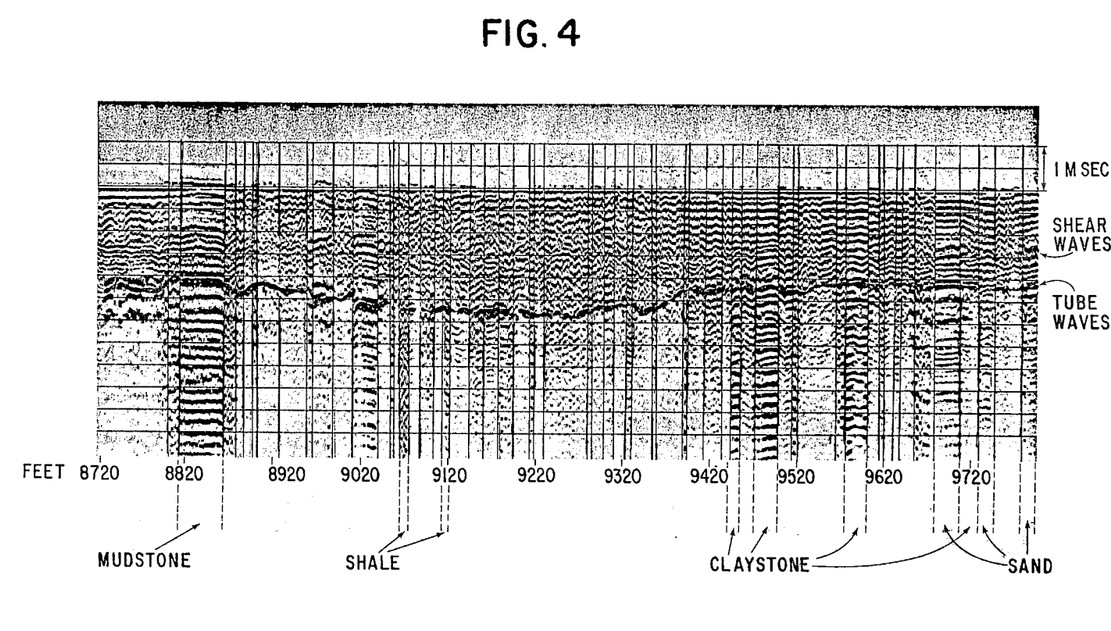

Preferably, for every foot along the borehole, a wave train of 10 msec. duration is recorded at the surface from each of receivers 28, 32 and 36. This wave train is sampled at 5 μsec. intervals and stored. The digital data may be but need not necessarily be processed by a computer program which determines the time of the first arrival (P-wave) equalizes the amplitude of each wave train utilizing the P-wave along the profile and aligns the arrival at one arbitrary time. This is done to compensate for possible variations in the acoustic energy source during the logging run. Such data has been retrieved and plotted as shown in FIGS. 3 and 4 and is used to identify the tube wave arrivals for each receiver. An appropriate time window on the order of 0.5 msec. around the arrival times of the tube wave is selected. The maximum peak to trough amplitude in this window is determined. The change in amplitude with depth is observed. Such amplitude provides a measure of permeability.

Figure 5:
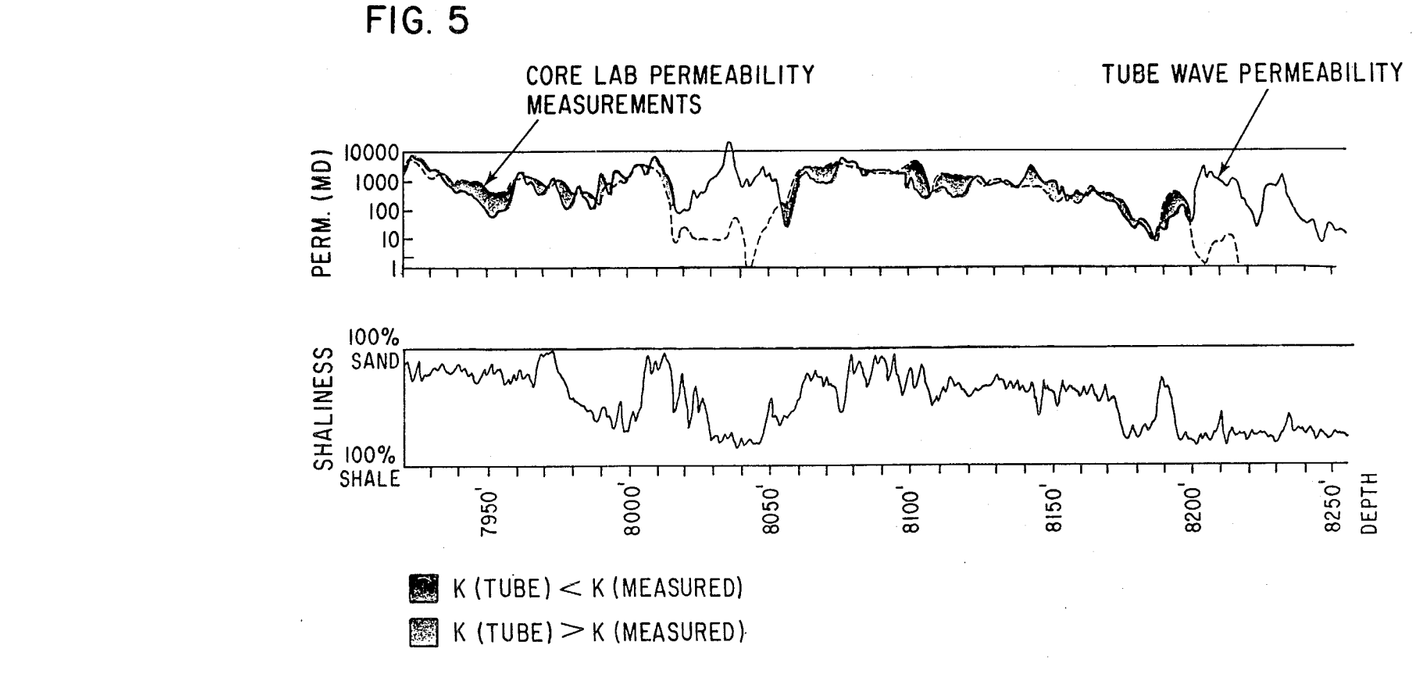
FIG. 5 shows logs of the permeability as determined by normalized tube wave amplitudes detected using the apparatus of the present invention at particular intervals and also by a side-wall core method as compared to shaliness over the same intervals.

As may be seen from FIG. 4, the data quality deteriorates due to the difficulty of identifying tube wave arrival times in shale and accordingly, the present invention is of less utility in areas of high shaliness. However, referring now to FIG. 5, logs of the normalized amplitude for the selected window around the tube wave arrival were calibrated and compared with core permeability samples at those intervals. Good correlation may be seen except in the aforementioned areas of high shaliness.

Figure 6:
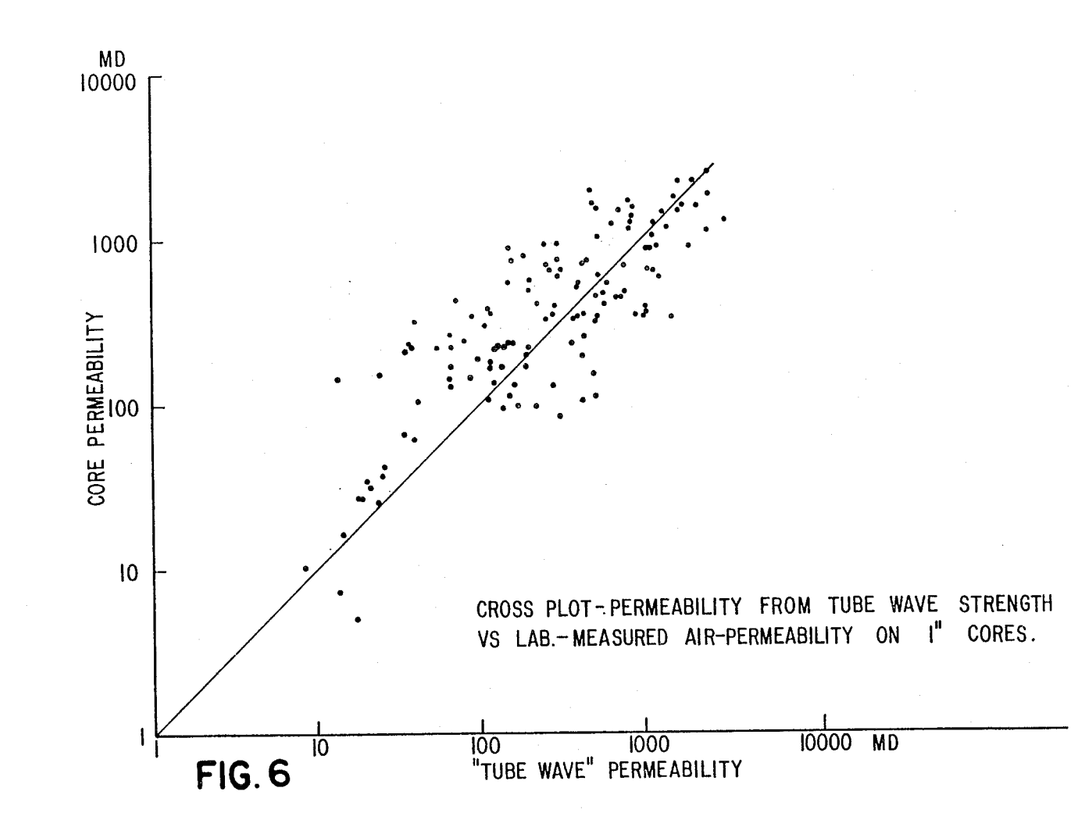
FIG. 6 is a plot of estimated permeability obtained from utilization of the apparatus of the present invention vis-as-vis permeability measurements taken utilizing a core technique.

Referring now to FIG. 6, a cross-plot of core measured permeabilities as compared to estimated permeabilities determined from tube wave amplitudes utilizing the apparatus of the present invention may be seen and correlation may be seen in the entire range between 10 and 10,000 millidarcies.

Figure 7:
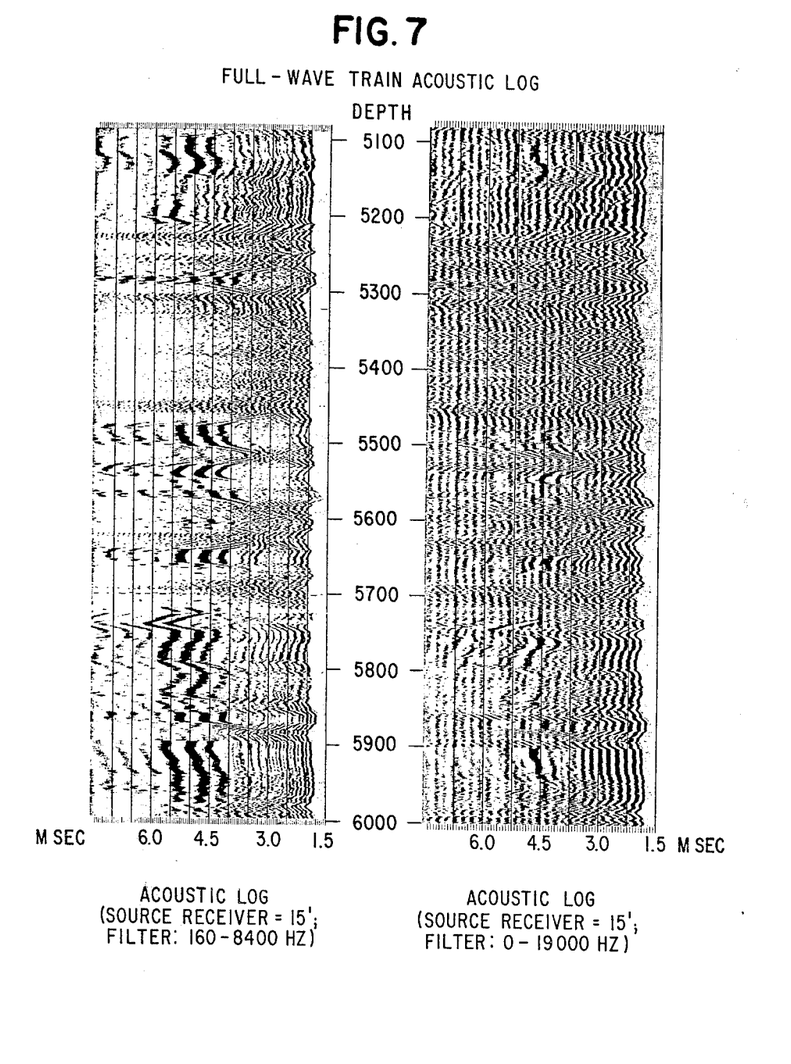
FIG. 7 are normalized wave train records obtained employing the well logging system of FIG. 1 when compared to a well logging system of the prior art and having longer than normal transmitter-receiver spacing.

Referring now to FIG. 7, wave form recordings using the apparatus of the present invention may be seen on the left as compared to wave form recordings made utilizing a apparatus believed to be prior art wherein the spacing between the transmitting means and the first receiver was approximately 15 feet. However, the aforementioned prior art device did not employ a wide band receiver such as disclosed in accordance with the present invention. Also, the receiver and transmitting means in that device were encased is a rigid housing as opposed to the cable arrangement of the present invention. As is apparent, the identification of distinctive tube waves was precluded.

Having described specific embodiments of the incident invention, it will be understood that further modifications thereof may be suggested to those skilled in the art, and it is intended to cover all such modifications as fall within the scope of the appended claims.

What is claimed is:
1. A method of determining the permeability of a formation comprising:
   - traversing a bore-hole with a tool having a means for transmitting low-frequency acoustic energy;
   - periodically pulsing said transmitting means;
   - detecting said acoustic energy at a first receiver having a frequency response under bore-hole conditions of between 0.1k Hz and 30k Hz, said receiver being coupled to said transmitting means by a cable having a length exceeding about five feet;
   - determining the amplitude of tube waves detected by said receiver at a plurality of locations in said borehole; and, producing a log of values related to said determined tube wave amplitude and correlated with permeability values for said plurality of locations.

2. The method of claim 1 wherein said detecting is accomplished by said first receiver at a distance of about 15 feet from said transmitting means.

3. The method of claim 1, wherein said log of values a log of determined tube wave amplitudes, said method further comprising the step of:

observing a change in amplitude of said recorded tube waves from one of said plurality to another of said plurality of locations in said bore-hole as a change in formation permeability.

4. The method of claim 1 wherein said determining is accomplished by measuring the maximum peak to through amplitude of said tube waves at each of said plurality of locations.

5. The method of claim 2 further comprising the step detecting said acoustic energy at a distance of about 20 feet from said transmitting means with a second receiver having said frequency response, and wherein said determining step includes the determination of the amplitude of tube waves detected by both said first and said second receivers at said plurality of locations in said bore-hole.

6. The method of claim 5 further including the step determining a first ratio of tube wave amplitude detected by said first receiver to tube wave amplitude detected by said second receiver at each of said plurality of locations in said bore-hole.

7. The method of claim 6 further comprising the step detecting said acoustic energy at a distance of about 25 feet from said transmitting means with a third receiver having said frequency response and wherein said determining step includes the determination of the amplitude of tube waves detected by said first, said second and said third receivers at a plurality of locations in said bore-hole.

8. The method of claim 7 further comprising the step of:

determining a second ratio of tube wave amplitude detected by said second receiver to tube wave amplitude detected by said third receiver at each of said plurality of locations in said bore-hole.

9. A method of determining the permeability of a formation comprising:

traversing a bore-hole with a tool having a means for transmitting acoustic energy from at least 1k Hz to 20k Hz;

pulsing said transmitting means;

detecting said acoustic energy at a first receiver of a type having a cylinder of piezoelectric material with end plates sealing both ends of said cylinder and a passageway through one of said end plates which transmits ambient pressure changes, but not dynamic pressure changes, said receiver having a frequency response between 0.1k Hz and 30k Hz, said receiver being coupled to said transmitting means by a cable having a length exceeding 5 feet;

determining the amplitude of tube waves detected by said receiver at a plurality of locations in said bore-hole; and, producing a log of values related to said determined tube wave amplitude and correlated with permeability values for said plurality of locations.

10. The method of claim 9 wherein said detecting is accomplished by said first receiver at a distance of at least fifteen feet from said transmitting means.

11. The method of claim 9, further including observing a change in said produced log of values from one of said plurality to another of said plurality of locations in said bore-hole as an indication of a change in formation permeability.

* * * * *